US011272089B2

(12) United States Patent
Westmacott (10) Patent No.: US 11,272,089 B2
(45) Date of Patent: Mar. 8, 2022

(54) SYSTEM AND METHOD FOR POSITION TRACKING AND IMAGE INFORMATION ACCESS

(71) Applicant: Sensormatic Electronics, LLC, Boca Raton, FL (US)

(72) Inventor: Ian Christopher Westmacott, Tewksbury, MA (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 797 days.

(21) Appl. No.: 14/741,102

(22) Filed: Jun. 16, 2015

(65) Prior Publication Data

US 2016/0373639 A1 Dec. 22, 2016

(51) Int. Cl.
*H04N 5/232* (2006.01)
*H04N 7/18* (2006.01)
*G01S 5/16* (2006.01)

(52) U.S. Cl.
CPC ........... *H04N 5/23206* (2013.01); *G01S 5/16* (2013.01); *H04N 5/23299* (2018.08); *H04N 7/181* (2013.01)

(58) Field of Classification Search
CPC .......................... H04N 5/23206; H04N 7/181
See application file for complete search history.

(56) References Cited

U.S. PATENT DOCUMENTS

| | | |
|---|---|---|
| 5,875,304 A | 2/1999 | Winter et al. |
| 6,476,858 B1 | 11/2002 | Ramirez Diaz et al. |
| 7,777,783 B1 | 8/2010 | Chin et al. |
| 8,174,572 B2 | 5/2012 | Buehler et al. |
| 8,502,868 B2 | 8/2013 | Buehler et al. |
| 8,634,858 B1 | 1/2014 | Jackson |
| 8,639,640 B1 | 1/2014 | Kadous |
| 8,661,121 B1 | 2/2014 | Mendis |
| 8,977,748 B1 | 3/2015 | Mendis |
| 8,983,764 B2 | 3/2015 | Jacobs et al. |
| 2009/0094649 A1 | 4/2009 | Patel |

*Primary Examiner* — Y Lee
(74) *Attorney, Agent, or Firm* — HoustonHogle LLP (57) ABSTRACT

A system and method for the melding of information from tracking systems and surveillance camera systems uses the tracking information as a technique for indexing and organizing the image information from the surveillance camera systems. Video clips from surveillance cameras are accessed while tracking positions of user devices. This can enable the access of the image information using the tracked positions of the user devices.

12 Claims, 7 Drawing Sheets

SYSTEM AND METHOD FOR POSITION TRACKING AND IMAGE INFORMATION ACCESS

BACKGROUND OF THE INVENTION

Systems for the tracking of mobile computing devices, and thus their users, are becoming more common. Some systems rely on the participation of the users. In these cases, often an application program (app) executes on the user device. The user device has position awareness provided by a GPS (global positioning system) chip set and antenna, for example. Position awareness can also be attained by reference to cellular or WiFi signals. The user device then periodically notifies the tracking system and/or responds to requests for position from the tracking system with its position. In other situations, the user devices can be passively tracked by the tracking system. Common techniques include sniffing for WiFi or Bluetooth radiofrequency (RF) emissions from the user devices.

At the same time, surveillance camera systems are becoming ubiquitous. These camera systems will usually include various types of cameras such as fixed cameras, e.g., wide field or fisheye lens cameras, and adjustable cameras, e.g., dome cameras and pan, tilt, zoom (PTZ) cameras. The images generated by the cameras can be stored locally on the cameras and/or stored in a common repository such as a network video recorder (NVR).

SUMMARY OF THE INVENTION

The present invention concerns the melding of information from tracking systems and surveillance camera systems. It uses the tracking information as a means for indexing, organizing, and/or realtime access to the image information from the surveillance camera systems.

In general, according to one aspect, the invention features a method for accessing video clips from surveillance cameras. This method comprises tracking positions of user devices, acquiring image information from surveillance cameras, and enabling the access of the image information using the tracked positions of the user devices.

In embodiments, enabling access to the image information encompasses retrieving image information for time periods when the user devices were within fields of view of the surveillance cameras and providing the retrieved image information to an operator such as via a user interface on a display device. A compendium of the retrieved image information can also be generated. This can be a compilation of image information, such as video clips, from multiple surveillance cameras, organized in time as the user device, and thus the tracked user, proceeds along a path through a building, for example.

In general, the fields of view of the surveillance cameras need to be determined with respect to a tracked coordinate space for the user devices. In some cases, this information is updated if pan angles or tilt angles or zoom positions of any surveillance camera changes.

In general, according to another aspect, the invention features a system for accessing image information, such as video clips, from surveillance cameras. The system comprises a tracking system for tracking positions of user devices for a tracked coordinate space and a surveillance camera system for acquiring image information from surveillance cameras within the tracked coordinate space. An image call-up system enables the access of the image information using the tracked positions of the user devices.

In general, according to another aspect, the invention features a method for image information access. The method comprises displaying a floor plan for a building and indicating paths of user devices with respect to the floor plan. The location of surveillance cameras along the paths is also indicated. The method further provides for the accessing of image information from the surveillance cameras for time periods when the user devices were within fields of view of the surveillance cameras along the paths.

In embodiments, displaying the floor plan comprises displaying a schematic graphic on a video display device.

Image information can be retrieved for time periods when the user devices were within fields of view of the surveillance cameras and a compendium can be generated of the retrieved image information from multiple surveillance cameras. This can include split displays with image information from multiple surveillance cameras for time periods when the user devices were within the fields of view of multiple surveillance cameras.

In general, according to another aspect, the invention features a system for image information access. The system comprises a tracking system for tracking positions of user devices for a tracked coordinate space and a surveillance camera system for acquiring image information from surveillance cameras within the tracked coordinate space. An image call-up system displays a plan for the tracked coordinate space, indicates paths of user devices with respect to the plan, and indicates surveillance cameras along the paths. The system further enables access to image information from the surveillance cameras for time periods when the user devices were within fields of view of the surveillance cameras along the paths.

In general, according to another aspect, the invention features a method for accessing image information from surveillance cameras. The method comprises tracking positions of user devices, acquiring image information with surveillance cameras, using the tracked positions of the user devices to find a surveillance camera with a field of view covering a current position of the user device, and providing image information from that surveillance camera.

In general, according to another aspect, the invention features a system for accessing image information from surveillance cameras. The system comprises a tracking system for tracking positions of user devices for a tracked coordinate space and a surveillance camera system for acquiring image information from surveillance cameras within the tracked coordinate space. An image call-up system uses the tracked positions of the user devices to find a surveillance camera with a field of view covering a current position of the user device and provides the image information from that surveillance camera.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
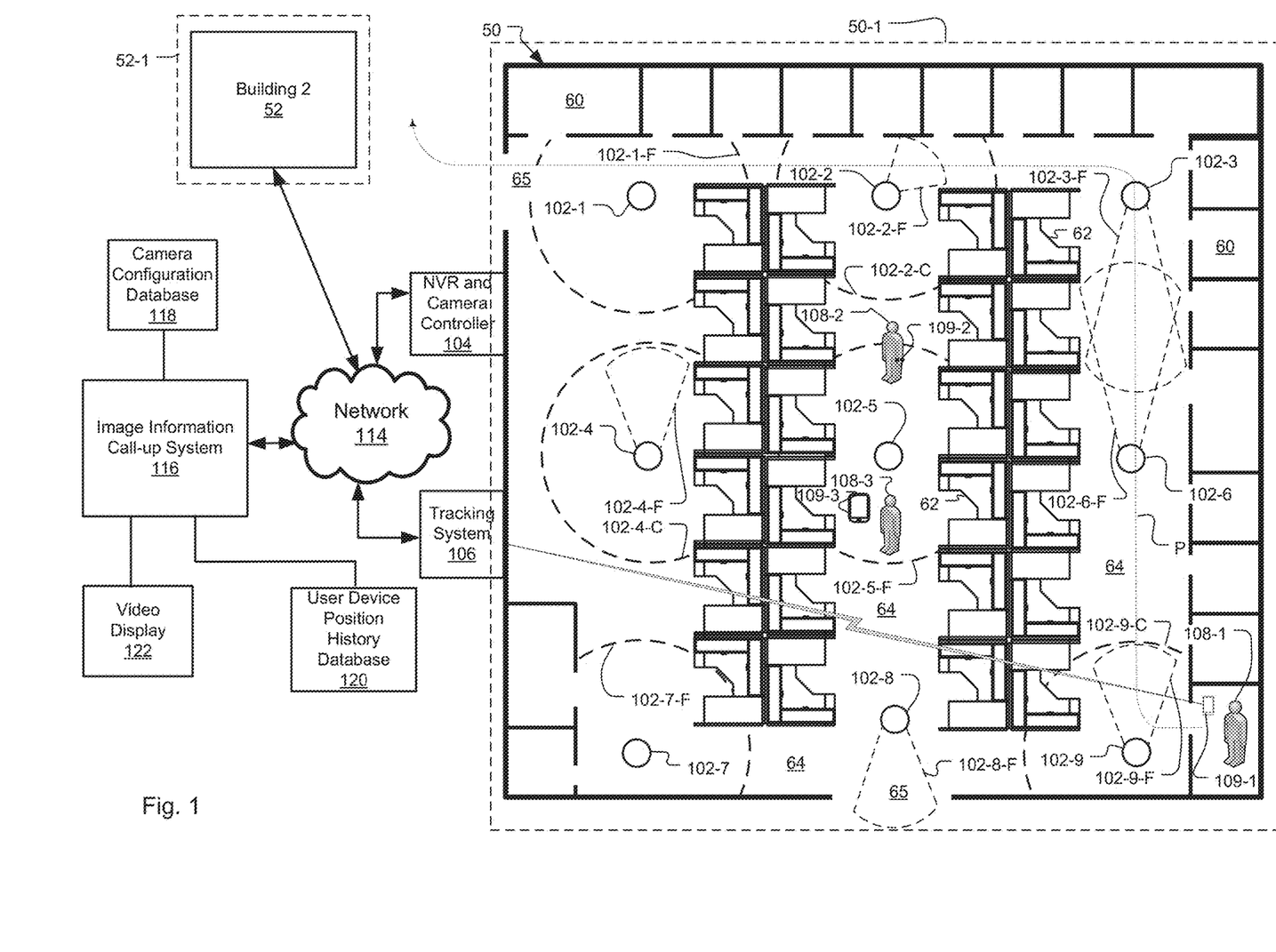
FIG. 1 is a schematic and block diagram showing the video call-up and clip generation system according to the present invention for a tracked coordinate space of a building.

FIG. 1 shows an identity-based tracking and image information accessing system that has been constructed according to the principles of the present invention.

A floor of a building 50 is shown. In the specific illustrated example, the building floor includes a series of offices 60 around the outer periphery. Through the interior are hallways 64 separated by lines of cubes 62.

A tracking system 106 provides coverage for the illustrated floor of the building 50. Specifically, the position tracking system 106 defines a tracked coordinate space 50-1 in which user devices 109 and specifically the locations or positions of those user devices can be determined.

As illustrated, the tracked coordinate space may extend across additional buildings such as building-2 52. This separate building or floor may have its own tracked coordinate space 52-1 or the tracked coordinate space may be simply an extension of the tracked coordinate space 50-1 for building 50.

As is also common, the building 50 further has a surveillance camera system. Different types of surveillance cameras 102 are distributed throughout the floor of the building 50 in the illustrated example. These cameras are typically located in hallways 64 and are often located near doors or exits 65 to those hallways or the building.

The surveillance cameras are characterized by their different fields of view. Some surveillance cameras may have a field of view that extends in a full 360° range, whereas other surveillance cameras may only collect image information from a specific direction. Still other surveillance cameras may have fields of view that change over time or are controllable.

In the illustrated example, surveillance cameras 102-1, 102-5, and 102-7 are wide field of view surveillance cameras or fisheye cameras. This is evident from the corresponding fields of view for each of these cameras within the tracked coordinate space 50-1. For example, surveillance camera 102-1 has a field of view 102-1-F that extends through a 360° range. Likewise, references 102-5-F and 102-7-F refer to the fields of view for surveillance cameras 102-5 and 102-7, respectively. The advantage of these wide field of view surveillance cameras is that they can cover or surveil a wide area and can be useful at the intersection of hallways, for example.

Also illustrated are adjustable cameras or dome surveillance cameras 102-3, 102-6, and 102-8. Adjustable or dome surveillance cameras typically have a narrower field of view within the tracked coordinate space 50-1 that extends along a specific axis or direction. For example, adjustable cameras 102-3 and 102-6 face each other and thus have overlapping fields of view 102-3-F and 102-6-F, respectively. Adjustable camera 102-8 is directed at a doorway such that its field of view 102-8-F covers the adjacent doorway.

Also illustrated are motorized or controllable surveillance cameras. These are commonly referred to as pan tilt zoom (PTZ) cameras 102-2, 102-4, and 102-9. With these surveillance cameras, the pan angle, tilt angle and zoom setting can be operator controlled or automatically controlled. As result, they each have a relatively large area of coverage. For example, the area of coverage of surveillance camera 102-2 is 102-2-C, the area of coverage of camera 102-4 is 102-4-C and the area of coverage of surveillance camera 102-9 is 102-9-C. These areas of coverage for the controllable surveillance cameras represent the area within the tracked coordinate space that the surveillance cameras can potentially surveil. Nevertheless, at any given moment, each camera has a particular tilt angle, pan angle and zoom setting. Thus this corresponds to their respective current fields of view 102-2-F, 102-4-F, and 102-9-F.

In some cases, the surveillance cameras are controlled by internal controllers to each of the cameras. Further, image information or video may be stored locally on the cameras or in a distributed fashion across multiple cameras 102 within the system. In still other examples, a network video recorder and camera controller 104 are provided that coordinate the operation of the surveillance cameras 102 and also receive and store image information, such as video, from each of the cameras 102.

A video or image information call-up system 116 is also provided. This call-up system obtains tracking information from the tracking system 106 and obtains image information or video possibly stored by the camera controller 104, stored on the cameras 102, and/or stored in some other image information repository.

In general, the image information call up system 116 enables the access of image information generated by the surveillance cameras 102 using the tracked positions of the user devices maintained by the tracking system 106. Specifically, image information can be retrieved for time periods when the user devices were within the fields of view of the surveillance cameras. The image information can also be provided as live/realtime image information when a tracked user is determined to be within the current field of one of the camera 102. This retrieved image information (live or previously recorded) can be provided to an operator via a video display 122 for example. Further, this video display 122 can be a mobile computing device that is used by a security professional for the building 50. On the other hand, it could alternatively be a video display associated with a security guard station for the building.

In order to obtain the access to image information using the tracked positions of the user devices, the call-up system 116 either maintains or has access to data corresponding to the fields of view of the surveillance cameras 102 and the user device position history or realtime position obtained by the tracking system 106. In the illustrated example, this information is shown as being stored in two databases that are maintained or at least accessible by the call-up system 116. Specifically, a camera configuration database 118 stores the fields of view for each of the surveillance cameras 102. It also preferably stores the areas of coverage for controllable surveillance cameras such as the area of coverage 102-2-C for surveillance camera 102-2 in addition to its current field of view 102-2-F.

The fields of view 102-*n*-F for each of the surveillance cameras should be represented within the coordinate system of the tracked coordinate space 50-1. Thus, the field of view of each camera is represented as an area or a volume in the two-dimensional or three-dimensional, respectively, coordinate space of the tracking system 106.

In operation, in the example of a user or tracked individual 108-1 leaving their office and walking through the hallways 64 of the building 50, their path P extends through the hallways and periodically overlaps with the fields of view of a series of surveillance cameras. Because the user 108-1 is carrying a trackable device, such as a portable computing device, e.g., a smart phone 109-1, their position and thus path P can be determined by the tracking system 106. This path is stored to the user device position history database 120. In the illustrated example, the path extends through the camera fields of view 102-9-F to 102-6-F to 102-3-F to 102-2-F to 102-1-F until the user 108-1 leaves the tracked coordinate space 50-1.

The path information is stored in the user device position history database 120 in a data structure that is indexed by the Device ID (device identifier) for the user 108-1 and/or the user device 109-1 assigned to that user. In one example, the data structure is a linked list of time and positioned pairs: Time1 (T1), position1; Time2 (T2), position2; . . . , in which the position corresponds to the position within coordinate space 50-1 or an absolute position such as longitude, latitude and height above sea-level.

Figure 2:
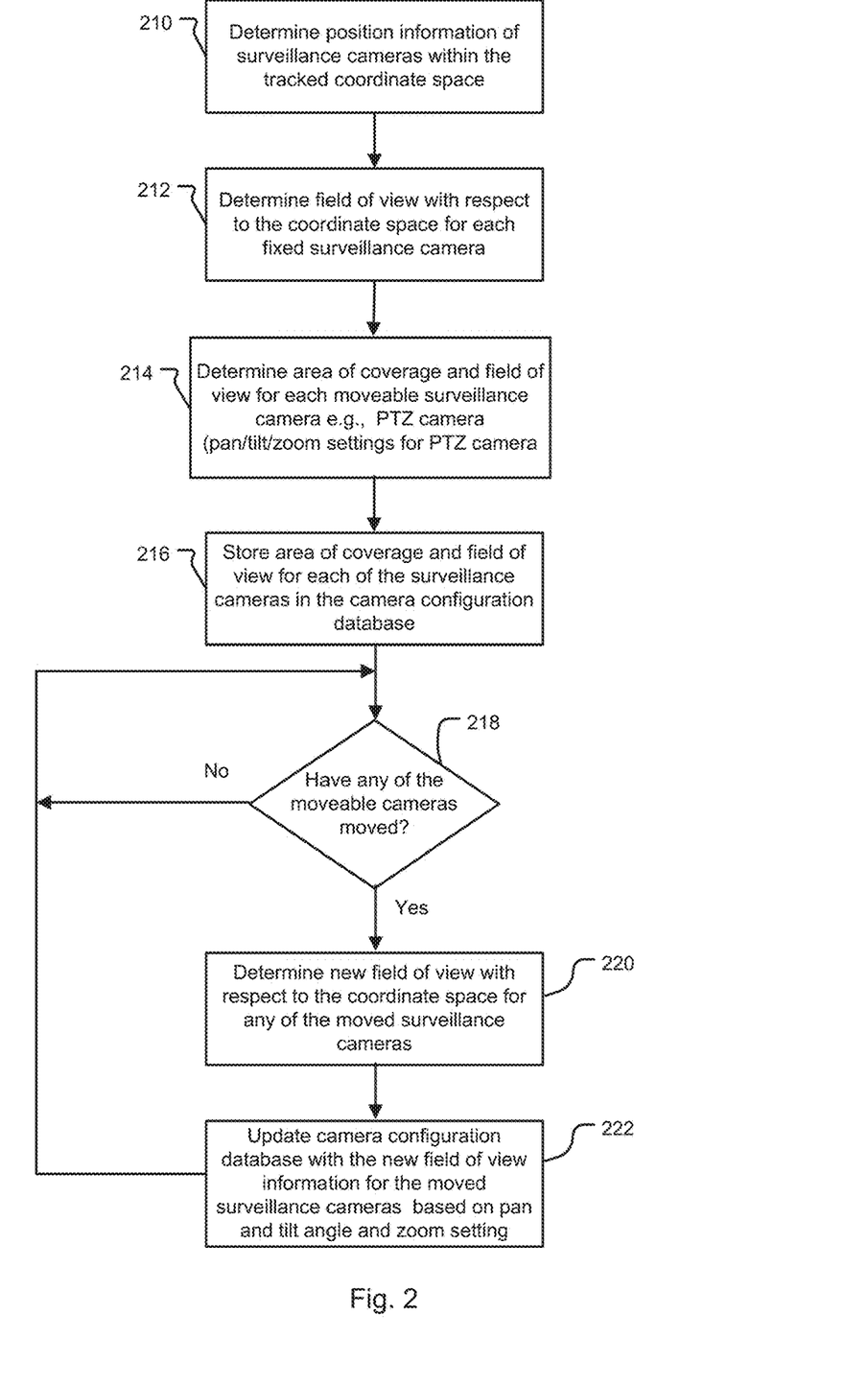
FIG. 2 is a flow diagram showing a method for generating and maintaining current field of view information for surveillance cameras for the tracked coordinate space.

FIG. 2 is a flow diagram showing a method for generating and maintaining field of view information for surveillance cameras for the tracked coordinate space.

In general, often the field of view information and the area of coverage information for the surveillance cameras are established as part of an initial configuration. For example, upon installation of the surveillance cameras, the position of those surveillance cameras is determined within the coordinate space 50-1, in step 210. Further, the fields of view with respect to the coordinate space for each of the surveillance cameras are determined in step 212.

In the case of movable surveillance cameras, the area of coverage and potentially the field of view is also determined in step 214. Finally, this information concerning the area of coverage and the field of view for each of the surveillance cameras is then stored into the camera configuration database 118, in step 216.

In the case of controlled or motorized surveillance cameras, the field of view information changes with time and thus should preferably be updated. Specifically, in step 218, it is determined whether or not any of the movable cameras have been moved such that their field of view has changed. When it has changed, the new field of view is determined with respect to the coordinate in space of any of these surveillance cameras that have moved in step 220. The camera configuration database 118 is then updated with the new field of view information. Often, this is determined with reference to the pan angle, tilt angle and zoom setting for the respective surveillance cameras 102.

In some implementations, the camera configuration database 118 contains other information concerning the surveillance cameras 102. This information includes a camera ID, camera type, position information, area of coverage within the coordinate system of the tracked coordinate space 50-1, and the field of view dependency on pan angle, tilt angle and zoom setting.

Figure 3:
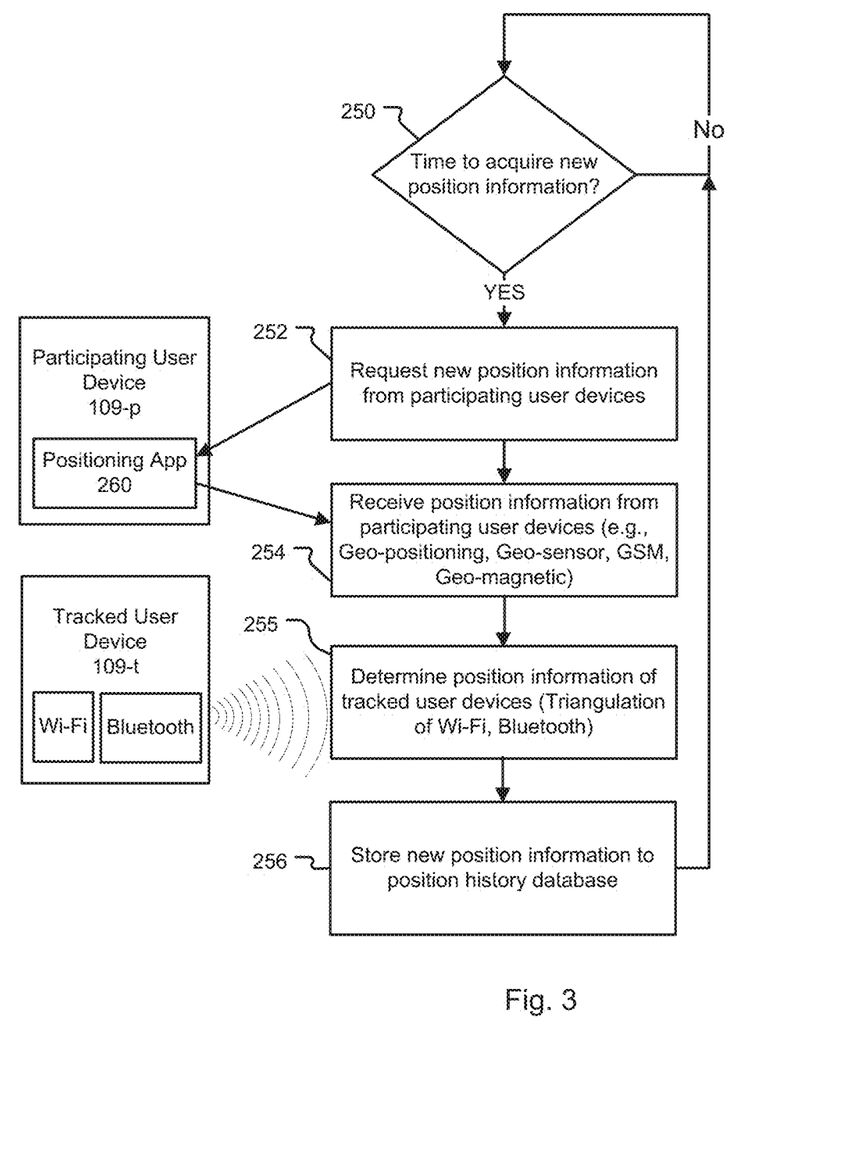
FIG. 3 is a flow diagram showing the tracking system obtaining user device location information.

FIG. 3 is a flow diagram showing the tracking system 106 obtaining user device location information.

In general, two basic approaches can be used for tracking user devices 109 and thus users 108 within the tracked coordinate space 50-1, 52-1. In some examples, the user devices participate in the tracking by providing their position information to the tracking system 106. Alternatively, or an addition, the tracking system 106 can passively track the user devices 109 and thus the users 108.

In the illustrated example, both approaches are used.

Specifically, in step 250, the tracking system 106 waits until it is time to acquire new position information.

For the user devices 109 that participate in the tracking, the tracking system 106 requests new position information for the participating user devices in step 252. In one example, this is a request that is sent to the user devices 109 through a cellular network, or a Wi-Fi packet network. In one example, the user devices 109 execute a positioning app 260 that receives the request and replies with position information. This can be the position within the coordinate space 50-1, or it can be other position information such as a latitude and longitude and height triplet, that is converted into the coordinate space of the tracked coordinate space 50-1 or used directly. In any case, the position information is received from the user device in step 254. In general, different technologies can be used to generate the position information such as geo positioning (global positioning system (GPS, GLONASS, Galileo, BDS, etc.)), geo-sensor, cellular position information or even geo-magnetically derived position information.

In an alternative embodiment or as additional operation, the position information of the user devices can be passively determined or sniffed in step 255. In one example, a tracked user device 109 may generate Wi-Fi transmissions or broadcasts or Bluetooth transmissions or broadcasts. In step 255, the location of the user device 109 is then determined by triangulation, for example based on these Bluetooth or Wi-Fi signals or other radiofrequency signals emitted or modulated by the tracked user device 109.

Finally, in step 256, the new position information is stored to the position history database along with the time stamp for that position.

In general, the user device position history database 120 maintains a series of position and time pairs P1, T1; P2, T2; P3, T3; . . . for each of the tracked or participating user devices 109.

In the case where a new user device 109 is discovered, the tracking database can be appended with the new device and its position information and the timestamp or current time. This allows for the creation of new tracking data structures for new devices as they enter the tracked coordinate space 50-1.

Figure 4:
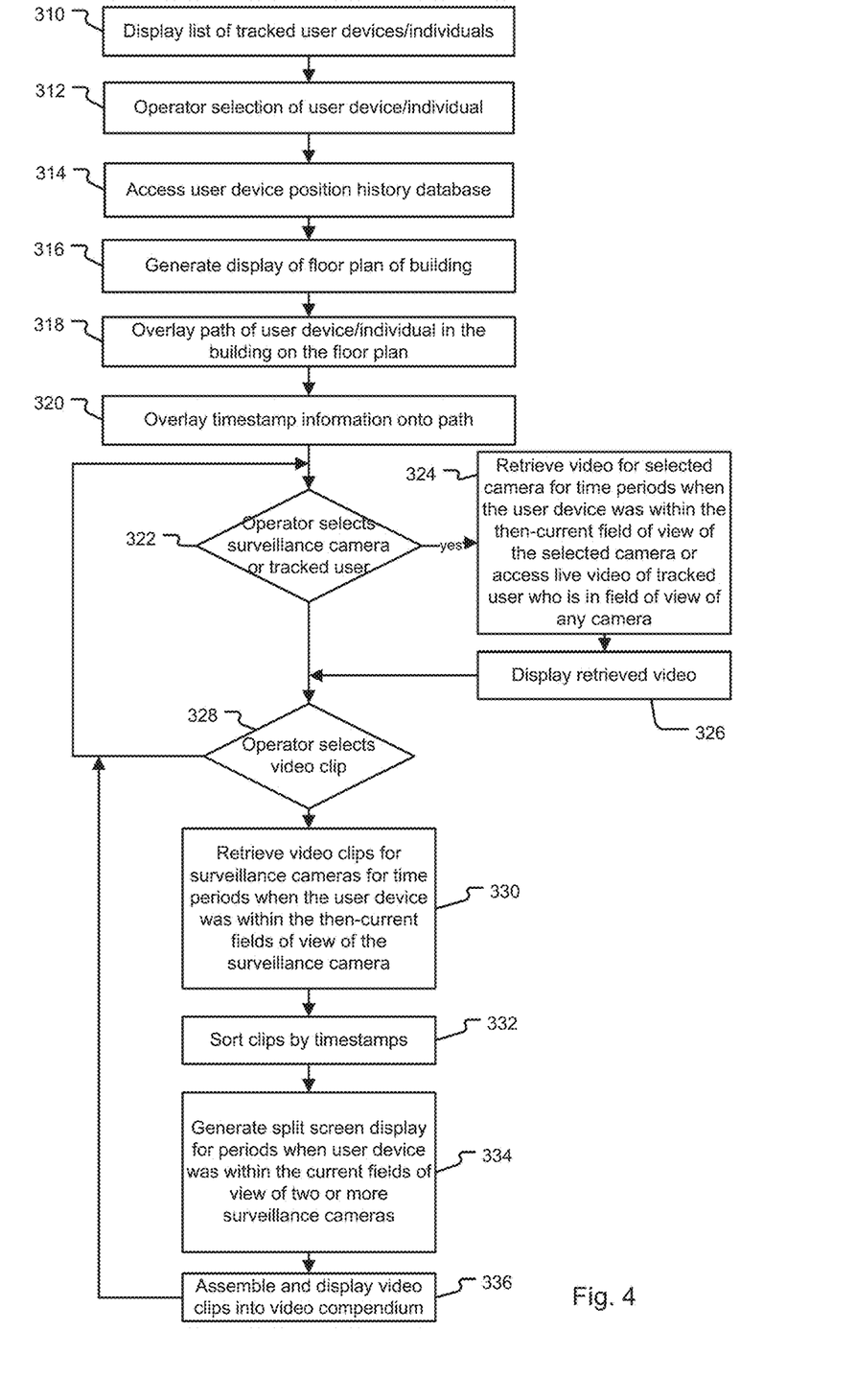
FIG. 4 is a flow diagram illustrating the method for image information call-up, accessing image information for surveillance cameras and clip or video compendium generation.

FIG. 4 is a flow diagram illustrating a method for image information access. In general the call-up system 116 provides a user interface that is accessible via the connected or mobile video display 122. In one example, this display, in step 310, displays a list of tracked user devices or individuals. The operator in step 312 can select one of the user devices or individuals. In response, the call up system 116 accesses the user device position history database 120 in step 314 and generates a display of the floor plan of the building 50 in step 316. Overlaid on this display is a path P of the user device or individual through the floor plan in step 318 along with timestamp information in step 320.

Figure 5:
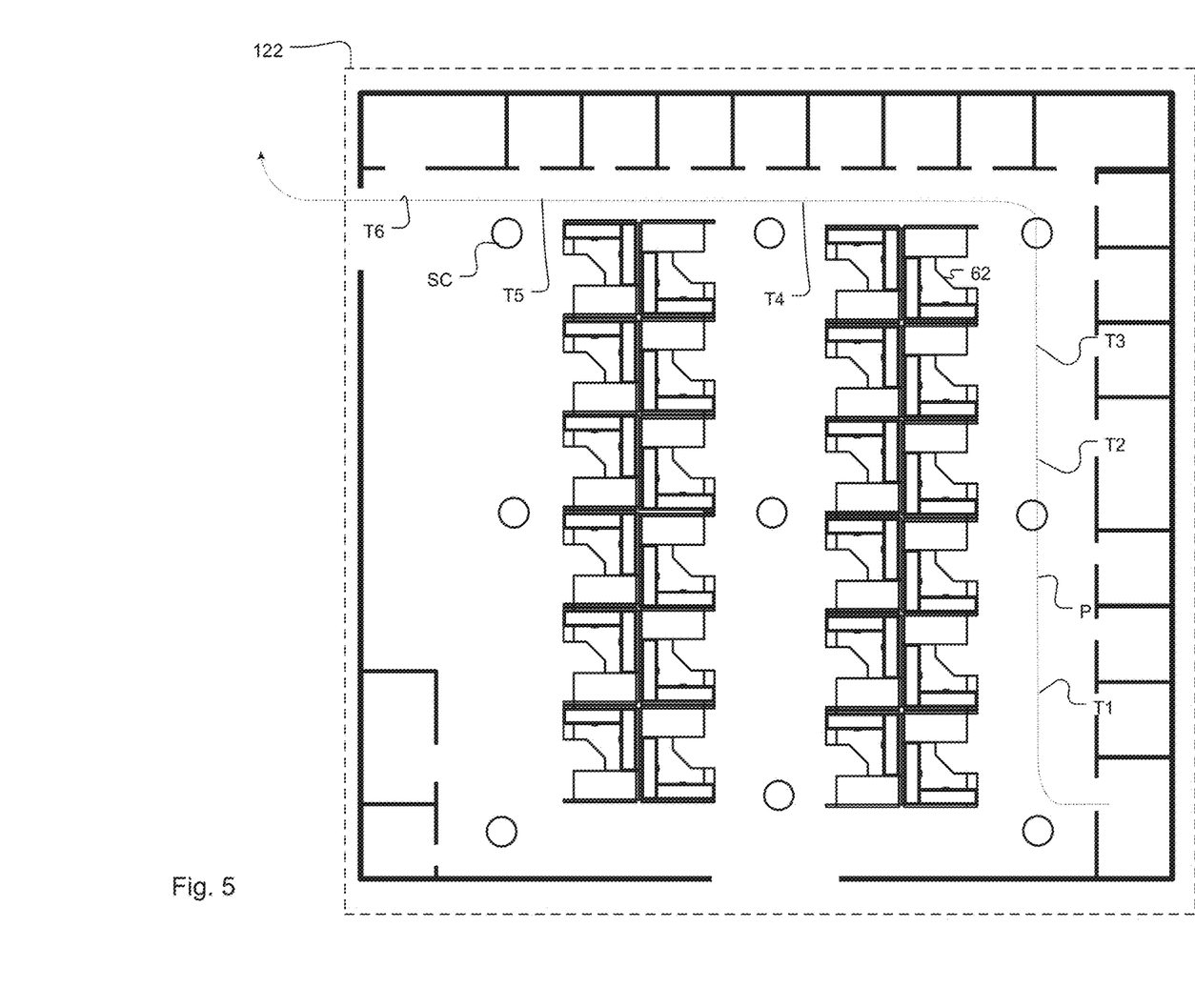
FIG. 5 shows a user interface display including the floor plan, selectable surveillance camera icons, the user device/individual path through the floor plan, and time stamp information.

An example of a user interface on display 122 is shown in FIG. 5. This shows the floor plan, the surveillance cameras 102 and possibly schematically shows their fields of view and/or areas of coverage. Finally, the path P of the user device/user through that floor plan is illustrated along with potentially timestamp information T1, T2, T3 . . . corresponding to the position of the user device 109 and when that position information was obtained.

In one mode of operation, the operator selects a surveillance camera icon SC within the video display or a tracked user from the list of tracked users in step 322. In response, the call-up system 116 retrieves the video for the selected surveillance camera for the time periods when the user device was in the then-current field of view for the selected surveillance camera. Or, the call-up system 116 accesses live video if the user is currently in the field of view of any camera, in step 324. This retrieved video is then displayed on the video display 122 in step 326. In the example of selecting icon SC image information corresponding to timestamps T5 through T6 is replayed on the display 122.

In another example, a video compilation or video clip or image information compendium is generated. Specifically, when the operator selects a video clip generation in step 328, the call up system 116 retrieves video clips for the surveillance cameras 102 for the time periods when the user device 109 was within the then-current field of view for the surveillance cameras in step 330. Then, in step 332, these video clips or image information are sorted by their time stamps. In cases where the user device was in the fields of view simultaneously for two surveillance cameras, a split screen video display is generated in step 334. Finally, the image information or video clips are assembled into a compendium in step 336 and displayed to the operator such as in a stitched video clip or exported from the system as a new video clip compilation in a collection of separate clips in a folder or ZIP file, for example.

Figure 6:
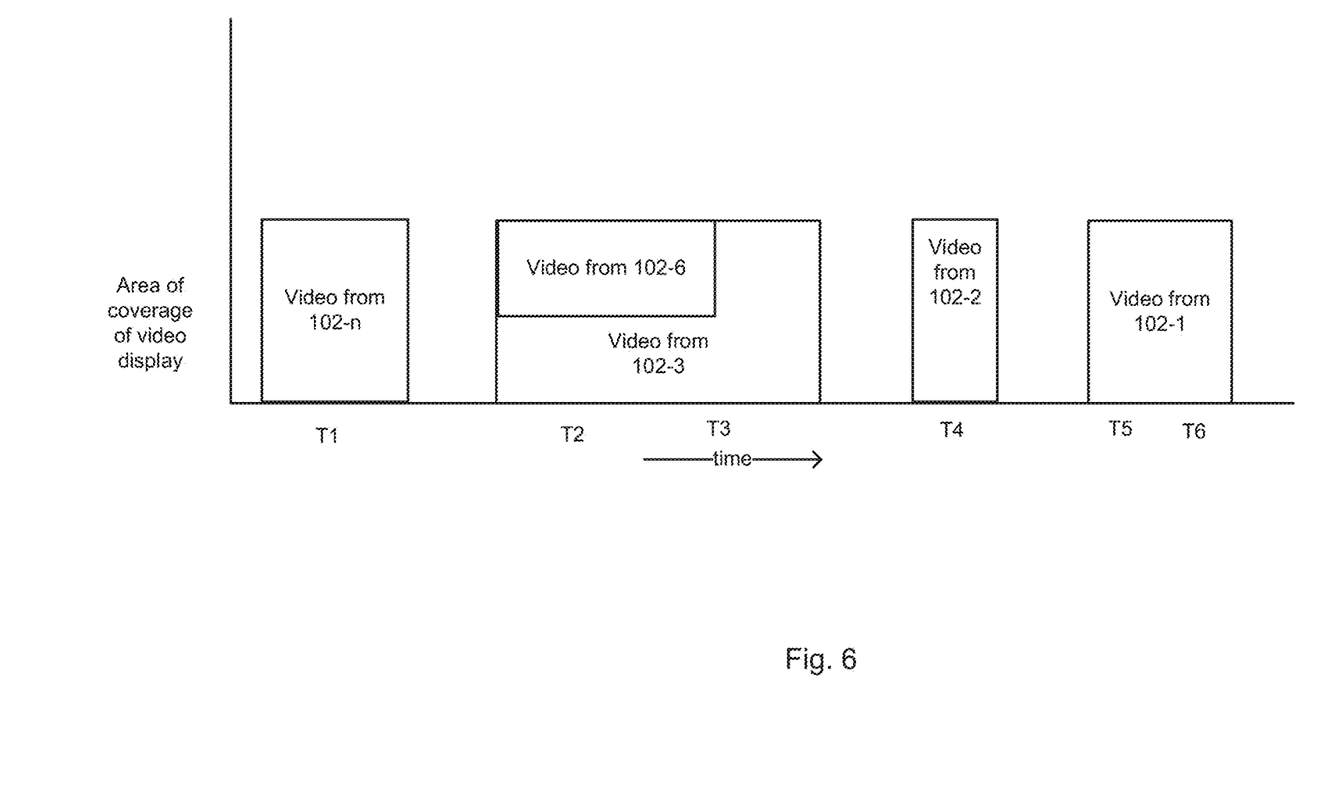
FIG. 6 is a schematic diagram showing the assembly of video clips from surveillance cameras along the path into a video compendium.

FIG. 6 illustrates the assembling of a compendium for the user device 109-1 for user 109-1 corresponding to path P. First, video or image information from surveillance camera 102-9 is presented. Then, as the path enters into the fields of view for surveillance cameras 102-6 and 102-3, split screen video display is generated. Then, as the path enters the field of view for surveillance camera 102-2, that cameras image information is provided. Finally, the information image information or video clips for the wide field of view camera 102-1 are provided.

And still another mode of operation, the system can be used to determine when two individuals possibly met within the tracked coordinate space 50-1. Specifically in this operation the call-up system reviews the position information for multiple users to determine when the position information for both users was in a common field of view of a surveillance camera at the same time. This is illustrated by users 108-2 and 108-3 being within the field of view of security camera 102-5, in FIG. 1. In this mode, the call-up system 116 provides the video showing the meeting of the two users.

Figure 7:
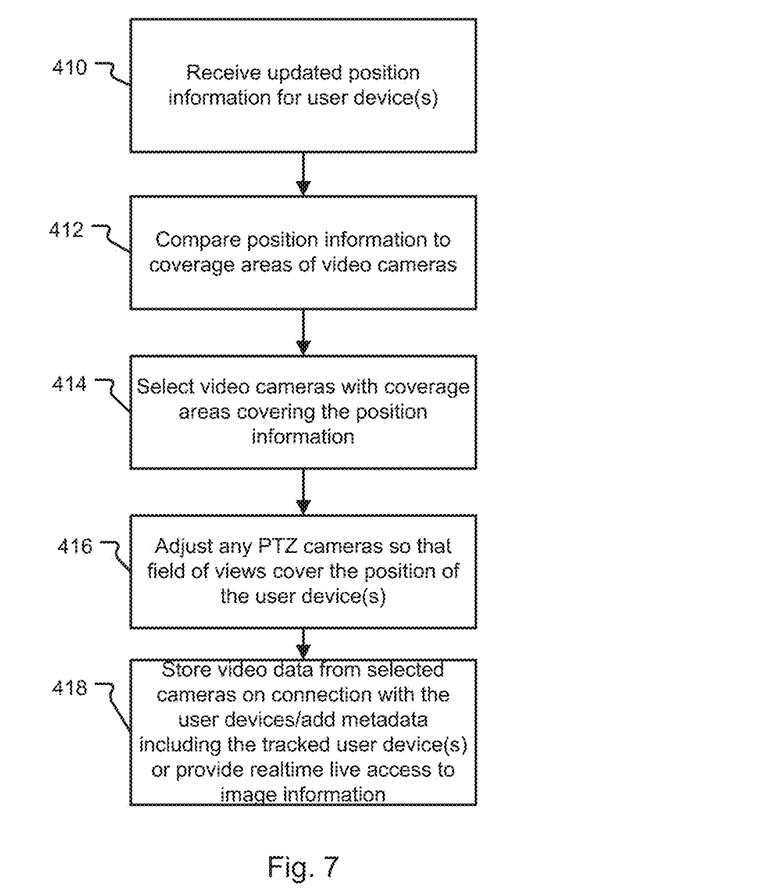
FIG. 7 is a flow diagram illustrating the use of position information to actively track a user device/individual.

In some examples, the path information obtained by the tracking system 106 can be used to dynamically configure the surveillance cameras 102, as when surveillance cameras are controllable or motorized. This operation is illustrated in FIG. 7.

Specifically, in step 410, the position information is received or determined for the user devices 109 by the tracking system 106. This position information is then compared to the areas of coverage for the surveillance cameras as stored in the camera configuration database 118 in step 412. In step 414, surveillance cameras which have coverage areas that are covering the current position information for the user devices are selected. In the case where those surveillance cameras are controllable, the pan angle, tilt angle and zoom setting for the selected surveillance cameras is controlled so that the fields of view cover the position of the user devices in step 416. Finally, in step 418, the image information for the selected cameras is stored in connection with user devices or as metadata including the tracked user devices. In addition, or in the alternative, the live/realtime image information is provided as video, for example, that is then displayed on the video display 122 as live video.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for accessing image information from surveillance cameras, the method comprising:
   tracking positions of user devices by the user devices providing position information to a tracking system;
   the tracking system requesting new position information from the user devices by sending requests to the user devices and the user devices receiving the requests and replying with the position information of the user devices;
   an image information call-up system updating a user device position history database based on the position information gathered by the tracking system and by reference to a camera configuration database that stores the fields of view for each of the surveillance cameras;
   acquiring image information from surveillance cameras; and
   enabling the access of the image information using the tracked positions of the user devices by the image information call-up system accessing the user device position history database that is indexed by device identifier for users of the user devices or the user devices, which are assigned to the users.

2. The method of claim 1, wherein enabling access to the image information comprises:
   retrieving image information for time periods when the user devices were within fields of view of the surveillance cameras; and
   providing the retrieved image information to an operator.

3. The method of claim 1, wherein enabling access to the image information comprises:
   retrieving image information for time periods when the user devices were within fields of view of the surveillance cameras; and
   generating a compendium of the retrieved image information from multiple surveillance cameras.

4. The method of claim 1, further comprising determining fields of view of the surveillance cameras with respect to a tracked coordinate space for the user devices.

5. The method of claim 4, further comprising updating the fields of view of the surveillance cameras if pan angles or tilt angles or zoom positions of the surveillance camera changes.

6. The method of claim 1, further comprising:
  determining fields of view of the surveillance cameras with respect to a tracked coordinate space for the user devices; and
  comparing the fields of view to the positions of the user devices.

7. A system for accessing image information from surveillance cameras, the system comprising:
  a tracking system for tracking positions of user devices for a tracked coordinate space by the user devices providing position information to the tracking system and the tracking system requesting new position information from the user devices by sending requests to the user devices and the user devices receiving the requests and replying with the position information of the user devices, the position information being stored to a user device position history database;
  a surveillance camera system for acquiring image information from surveillance cameras within the tracked coordinate space; and
  an image call-up system enabling the access of the image information using the tracked positions of the user devices, wherein the image call-up system accesses the user device position history database that is indexed by device identifier for users of the user devices or the user devices, which are assigned to the users and by reference to a camera configuration database that stores the fields of view for each of the surveillance cameras.

8. The system of claim 7, wherein image call-up system retrieves image information for time periods when the user devices were within fields of view of the surveillance cameras and displaying the retrieved image information.

9. The system of claim 7, wherein image call-up system retrieves image information for time periods when the user devices were within fields of view of the surveillance cameras and generates a compendium of the retrieved image information from multiple surveillance cameras.

10. The system of claim 7, wherein the image call-up system determines fields of view of the surveillance cameras with respect to a tracked coordinate space for the user devices.

11. The system of claim 10, wherein the image call-up system updates the fields of view of the surveillance cameras if pan angles or tilt angles or zoom positions of the surveillance camera changes.

12. The system of claim 7, wherein the image call-up system determines fields of view of the surveillance cameras with respect to a tracked coordinate space for the user devices and compares the fields of view to the positions of the user devices.

* * * * *